United States Patent
Kang et al.

(10) Patent No.: US 7,687,204 B2
(45) Date of Patent: Mar. 30, 2010

(54) NON-AQUEOUS ELECTROLYTE AND A LITHIUM SECONDARY BATTERY COMPRISING THE SAME

(75) Inventors: Jun-won Kang, Suwon-si (KR); Jin-Sung Kim, Suwon-si (KR)

(73) Assignee: Samsung SDI Co., Ltd, Suwon (KR)

( * ) Notice: Subject to any disclaimer, the term of this patent is extended or adjusted under 35 U.S.C. 154(b) by 1247 days.

(21) Appl. No.: 10/897,107

(22) Filed: Jul. 23, 2004

(65) Prior Publication Data

US 2005/0026043 A1    Feb. 3, 2005

(30) Foreign Application Priority Data

Jul. 31, 2003    (KR) ............... 10-2003-0053040

(51) Int. Cl.
*H01M 6/16*    (2006.01)
(52) U.S. Cl. ............ 429/331; 429/324; 429/327; 429/326
(58) Field of Classification Search .............. None
See application file for complete search history.

(56) References Cited

U.S. PATENT DOCUMENTS

| | | | |
|---|---|---|---|
| 5,352,458 A | 10/1994 | Yarosh | 424/450 |
| 5,529,859 A | 6/1996 | Shu et al. | 429/194 |
| 5,571,635 A | 11/1996 | Shu et al. | 429/194 |
| 5,626,981 A | 5/1997 | Simon et al. | 429/105 |
| 6,509,123 B1 | 1/2003 | Shibuya et al. | |
| 2002/0192565 A1* | 12/2002 | Ueda et al. | 429/331 |
| 2003/0148191 A1* | 8/2003 | Mori | 429/330 |

FOREIGN PATENT DOCUMENTS

| | | |
|---|---|---|
| CN | 1156932 C | 10/2001 |
| CN | 1398013 A | 2/2003 |
| JP | 10106624 | 4/1998 |
| JP | 2000-277146 | 10/2000 |
| JP | 2003007333 | 1/2003 |
| JP | 2003092137 | 3/2003 |
| JP | 2003517188 | 5/2003 |
| JP | 2003168478 | 6/2003 |
| JP | 2003203675 | 7/2003 |
| JP | 2003249262 | 9/2003 |
| JP | 2003257478 | 9/2003 |
| JP | 2005032701 | 2/2005 |
| JP | 2007134047 | 5/2007 |
| KR | 2000-0029410 | 5/2000 |

OTHER PUBLICATIONS

Machine Translation of Sekino et al., JP 2003-203675, Jul. 18, 2003.*
Machine Translation of Takehara et al., JP 2003-092137, Jan. 10, 2003.*

* cited by examiner

*Primary Examiner*—Dah-Wei D Yuan
*Assistant Examiner*—Maria J Laios
(74) *Attorney, Agent, or Firm*—H.C. Park & Associates, PLC

(57) ABSTRACT

An electrolyte for a lithium secondary battery comprises lithium salts including $LiPF_6$ and $LiBF_4$; a non-aqueous organic solvent including an organic solvent with high boiling point; and vinylene carbonate.

The electrolyte may inhibit battery swelling at high temperature storage and may improve battery cycle-life characteristics.

18 Claims, 3 Drawing Sheets

NON-AQUEOUS ELECTROLYTE AND A LITHIUM SECONDARY BATTERY COMPRISING THE SAME

This application claims the benefit of Korean Patent Application No. 2003-53040, filed on Jul. 31, 2003, which is hereby incorporated by reference for all purposes as if fully set forth herein.

BACKGROUND OF THE INVENTION

1. Field of the Invention

The present invention relates to an electrolyte for a lithium secondary battery and a lithium secondary battery comprising the same, and more particularly, to an electrolyte for a lithium secondary battery that may prevent the battery from swelling while maintaining its electrochemical properties, and a lithium secondary battery comprising the same.

2. Discussion of the Related Art

Due to recent trends toward more compact and lighter portable electronic equipment, there has been a growing need to develop high performance and large capacity batteries. Lithium secondary batteries with good safety characteristics and improved electrochemical properties have been extensively researched. These batteries use materials that reversibly intercalate or deintercalate lithium ions during charge and discharge reactions for positive and negative active materials. The positive active materials may include lithium metal oxide and the negative active materials may include lithium metals, lithium-containing alloys, or materials that are capable of reversible intercalation/deintercalation of lithium ions such as crystalline or amorphous carbons, or carbon-containing composites.

The average discharge voltage of a lithium secondary battery is about 3.6 to 3.7V, which is higher than alkali batteries, Ni-MH batteries, Ni—Cd batteries, and other similar batteries. An electrochemically stable electrolyte in the charge and discharge voltage range of 0 to 4.2V is required in order to generate such a high driving voltage. As a result, a mixture of non-aqueous carbonate-based solvents, such as ethylene carbonate, dimethyl carbonate, and diethyl carbonate is typically used as an electrolyte. However, this electrolyte may have significantly lower ion conductivity than an aqueous electrolyte used in a Ni-MH or Ni—Cd battery, thereby resulting in battery characteristic deterioration during high rate charging and discharging.

During the initial charge of a lithium secondary battery, lithium ions, which are released from the battery's lithium-transition metal oxide positive electrode, are transferred to a carbon negative electrode, where they are intercalated into the carbon. Because of its high reactivity, lithium reacts with the carbon negative electrode to produce $Li_2CO_3$, LiO, LiOH, and the like, thereby forming a thin organic solid electrolyte interface (SEI) film on the negative electrode's surface. The initially formed organic SEI film prevents a reaction between lithium ions and the carbon negative electrode, or other materials during charging and discharging. It also acts as an ion tunnel that allows the passage of only lithium ions and prevents the carbon negative electrode's disintegration, which is caused by co-intercalation of organic solvents having a high molecular weight along with solvated lithium ions into the carbon negative electrode.

Once the organic SEI film is formed, lithium ion numbers are not reduced because they do not react again with the carbon electrode or other materials. In other words, stable charging and discharging are maintained because when the carbon of the negative electrode initially reacts with an electrolyte, a passivation layer, such as an organic SEI film, is formed on the negative electrode's surface and prevents the electrolyte solution from decomposing (*Journal of Power Sources*, 51(1994), 79-104). For these reasons, in the lithium secondary battery, there is no irreversible formation reaction of the passivation layer, and a stable cycle-life may be maintained after initial charging.

However, during the organic SEI film-forming reaction, gases are generated inside the battery due to decomposition of a carbonate-based organic solvent (J. Power Sources, 72(1998), 66-70). Depending on the type of non-aqueous organic solvent and negative active material used, these gases may include $H_2$, CO, $CO_2$, $CH_4$, $C_2H_6$, $C_3H_8$, $C_3H_6$, and the like. Internally generated gases may increase battery thickness.

Electrochemical and heat energy slowly disintegrate the passivation layer. Disintegration may increase over time when the battery is stored at a high temperature after charging. As a result, a continuous side reaction occurs in which an exposed surface of the negative electrode reacts with surrounding electrolyte to generate gases, which increases the battery's internal pressure and induces deformation of prismatic or pouch battery. Consequently, regional differences in the cohesion among electrodes inside the electrode assembly (positive and negative electrodes, and separator) of the battery occur, thereby deteriorating the battery's performance and safety, which makes it difficult to mount the lithium secondary battery set into electronic equipment.

In order to improve low temperature characteristics, a lithium secondary battery having a liquid electrolyte uses an organic solvent with a low boiling point. But a prismatic or pouch battery may swell during high temperature storage, which deteriorates the battery's reliability and safety at a high temperature.

Accordingly, extensive research into a liquid electrolyte with a high boiling point is needed. An ester solvent, such as gamma butyrolactone, is an example of an electrolyte with a high boiling point. When using 30 to 70% of an ester solvent, however, cycle-life characteristics may significantly deteriorate. In order to reduce swelling at a high temperature and improve cycle-life characteristics, an electrolyte with a high boiling point, a mixture of gamma butyrolactone/ethylene carbonate (7/3), and a boron-coated mesocarbon fiber (MCF) as a negative active material have been suggested (Journal of Electrochemical Society, 149(1) A(9)~A12(2002)). However, when an uncoated carbonaceous material is used as a negative active material, cycle-life characteristics may deteriorate even when an electrolyte with a high boiling point is used.

U.S. Pat. Nos. 5,352,458 and 5,626,981 disclose an electrolyte comprising vinylene carbonate in order to overcome cycle-life deterioration shortcomings of a high viscosity electrolyte. However, sufficient cycle-life improvement may not be obtained.

U.S. Pat. No. 5,529,859 discloses a battery with improved performance that uses an electrolyte prepared by adding a halogenated organic solvent such as chloroethylene carbonate to propylene carbonate. U.S. Pat. No. 5,571,635 discloses a battery with improved performance that uses an electrolyte prepared by adding a halogenated organic solvent such as chloroethylene carbonate to a mixed solvent of propylene carbonate and ethylene carbonate. However, the propylene carbonate has a high viscosity, and it may decompose when it is intercalated into a carbon layer of crystalline negative active material such as graphite. Decomposition products of propylene gas and lithium carbonate may result in deterioration of capacity and increase of irreversible capacity. In the above patents, propylene carbonate and chloroethylene carbonate is mixed in a volume ratio of 1:1, which may deteriorate electrolyte wettability.

SUMMARY OF THE INVENTION

This invention provides an electrolyte for a lithium secondary battery that may improve cycle-life as well as swelling inhibition properties at a high temperature, and a lithium secondary battery comprising the same.

Additional features of the invention will be set forth in the description which follows, and in part will be apparent from the description, or may be learned by practice of the invention.

The present invention discloses an electrolyte for a lithium secondary battery comprising lithium salts including $LiPF_6$ and $LiBF_4$; a non-aqueous organic solvent including an organic solvent with high boiling point; and vinylene carbonate.

The present invention also discloses a lithium secondary battery comprising the electrolyte.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
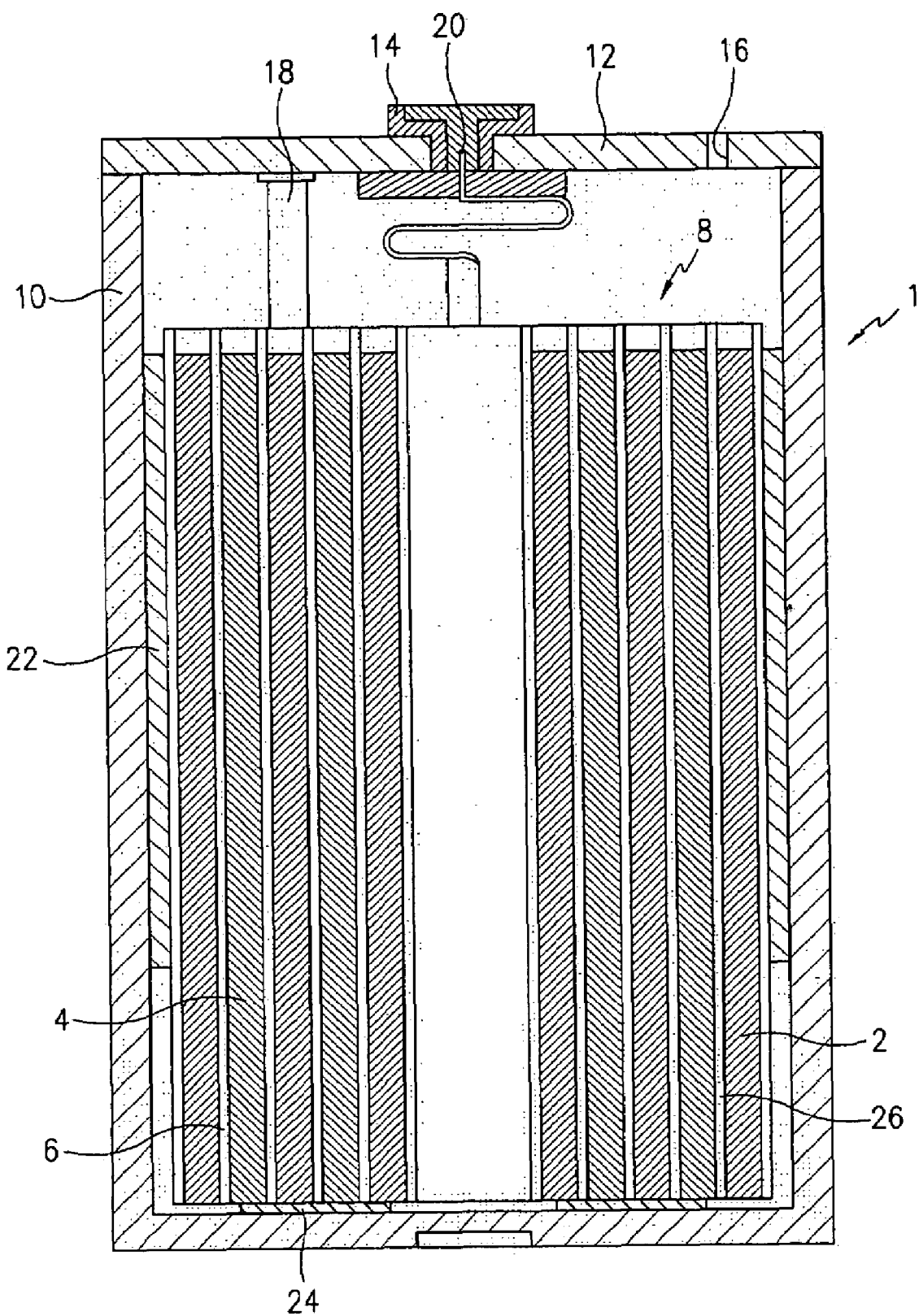
FIG. 1 shows a prismatic lithium secondary battery cell.

FIG. 1 shows a typical non-aqueous Li-ion cell. The Li-ion cell 1 is fabricated by inserting an electrode assembly 8, which includes a positive electrode 2, a negative electrode 4, and a separator 6 therebetween, into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are attached on the positive electrode 2 and negative electrode 4, respectively. Insulators 22 and 24 are installed on the lower part and the side part of the electrode assembly 8 to prevent internal short circuits.

The electrolyte of an exemplary embodiment of the present invention includes a solvent with a high boiling point, electrolyte salts and an additive compound. It may improve both swelling inhibition at a high temperature and cycle-life characteristics of the battery, even if a conventional material is used for the positive and negative active material.

An organic solvent with a high boiling point may be capable of improving swelling inhibition properties at a high temperature. But battery capacity and cycle-life characteristics significantly deteriorate when the solvent exceeds 50 vol % based on the total amount of organic solvent. Furthermore, an electrolyte including $LiPF_6$ as an electrolyte salt dissolved in the organic solvent with a high boiling point may cause serious initial swelling at high temperature storage.

Currently-used positive active materials include lithium-cobalt-based oxides, lithium-manganese-based oxides, lithium-nickel-based oxides, lithium-nickel-manganese-based oxides, and the like. The lithium-nickel-based and lithium-nickel-manganese-based oxides are inexpensive and manifest a high discharge capacity, but they are limited due to swelling of batteries from gas generation during high-temperature storage. However, the electrolyte of the present invention may help prevent battery performance deterioration, such as capacity and cycle-life, even when a lithium-nickel-based or lithium-nickel-manganese-based compound is used as a positive active material.

Graphite is a currently-used negative active material that has a good voltage flatness because it can maintain a certain potential during intercalation of lithium ions. However, it has a theoretical capacity of less than 372 mAh/g and a practical capacity of less than 300 mAh/g. Natural graphite has a larger discharge capacity than artificial graphite of mesocarbon microbeads (MCMB) or mesocarbon fiber (MCF), but it has a very large irreversible capacity and it deteriorates electrode discharge characteristics because of its flat shape. However, the electrolyte of the present invention shows good discharge characteristics even when graphite, particularly natural graphite, is used as a negative material.

The electrolyte for a lithium secondary battery of the present invention comprises lithium salts including $LiPF_6$ and $LiBF_4$; a non-aqueous organic solvent including an organic solvent with a high boiling point; and vinylene carbonate.

The electrolyte may inhibit swelling at high temperature storage and help prevent capacity and cycle-life deterioration, which is caused by usage of a non-aqueous organic solvent including organic solvent with high boiling point, even if conventional active materials are used.

The mixed salts of $LiPF_6$ and $LiBF_4$ may efficiently inhibit initial swelling at high temperatures and maintain good battery cycle-life.

The concentration of $LiPF_6$ may be in the range of about 1.0 to about 1.15 M and the concentration of $LiBF_4$ may be in the range of about 0.01 M to about 0.1M. The mole ratio of $LiPF_6$ and $LiBF_4$ ($LiBF_4/LiPF_6$) may be in the range of about 0.004 to about 0.1, preferably about 0.007 to about 0.05, more preferably about 0.01 to about 0.05, and still more preferably about 0.01 to about 0.03. When the mole ratio of $LiPF_6/LiBF_4$ is less than about 0.004, inhibition of initial swelling at high temperatures may not be sufficient, and when it is more than about 0.1, cycle-life deterioration may be a problem.

The lithium salt concentration preferably ranges from about 0.6 to about 2.0 M, and more preferably from about 0.7 to about 1.6 M. When the lithium salt concentration is less than about 0.6 M, the electrolyte performance may deteriorate due to its ionic conductivity. When its concentration is greater than about 2.0 M, the lithium ion mobility decreases due to increased electrolyte viscosity. The lithium salt makes basic battery operation possible because it acts as a lithium ion supply source.

The vinylene carbonate is added in a range of about 0.01 to about 10 wt %, preferably about 0.01 to about 5 wt %, and more preferably about 2 to about 5 wt % based on the total electrolyte amount. If used in an amount less than about 0.01 wt %, gas generation may not be sufficiently inhibited, and if used in an amount greater than about 10 wt %, the high temperature cycle-life characteristics may deteriorate, swelling may occur or low temperature discharge voltage may decrease.

The organic solvent with high boiling point means an organic solvent having a boiling point greater than about 100° C., preferably about 150° C., more preferably about 200° C. Examples of the organic solvent with high boiling point include γ-butyrolactone (GBL), ethylene carbonate, dipropyl carbonate, acid anhydride, N-methyl pyrrolidone, N-methylacetamide, N-methyl formamide, acetonitrile, dimethyl formamide, sulfolane, dimethyl sulfoxide, dimethyl sulfite, γ-valerolactone, γ-caprolactone, δ-valerolactone, ε-caprolactone, and other like substances. The organic solvent with high boiling point may also be a mixture of these substances.

The non-aqueous organic solvent includes about 2 to about 50 vol %, preferably about 5 to about 35 vol %, more preferably about 5 to about 30 vol % of an organic solvent with high boiling point based on the total amount of organic solvent. Swelling inhibition may be insufficient and low temperature discharge voltage may be lowered when the amount of organic solvent with high boiling point is less than about 2 vol %. When it is more than about 50 vol %, the cycle life characteristics may deteriorate. The non-aqueous organic solvent works as a medium that mobilizes ions capable of participating in the electrochemical reaction.

The electrolyte of the present invention may further include a carbonate-based organic solvent with low boiling point or an aromatic hydrocarbon solvent of Formula (1) together with the organic solvent with high boiling point:

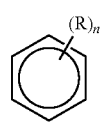

(1)

wherein R is halogen or $C_1$-$C_{10}$ alkyl; and n is an integer ranging from about 0 to about 6, preferably about 1 to about 5.

Examples of the carbonate-based organic solvent with low boiling point include dimethyl carbonate (DMC), diethyl carbonate (DEC), methylpropyl carbonate (MPC), ethylpropyl carbonate (EPC), methylethyl carbonate (MEC), propylene carbonate (PC), butylene carbonate (BC), and other like substances. The carbonate-based organic solvent with a low boiling point may also be a mixture of these substances. Examples of aromatic hydrocarbon solvents include benzene, chlorobenzene, nitrobenzene, fluorobenzene, toluene, fluorotoluene, trifluorotoluene, xylene, and other like substances. The aromatic hydrocarbon solvent may also be a mixture of these substances.

An electrolyte for a lithium secondary battery of the present invention may be stable at a temperature ranging from −20 to 60° C., thereby maintaining stable characteristics of the battery even at a voltage of 4V. In the present invention, the lithium secondary battery includes all lithium secondary batteries including lithium ion batteries, lithium polymer batteries, etc.

The lithium secondary battery of the present invention uses a positive active material that is capable of reversible intercalation/deintercalation of the lithium ions. Examples of such material are a lithium-containing metal oxide such as lithium-nickel-based oxide or lithium-nickel-manganese-based oxide or a lithium-containing calcogenide compound. Specific examples of the positive active material include $LiCoO_2$, $LiNiO_2$, $LiMnO_2$, $LiMn_2O_4$, $LiNi_{1-x-y}Co_xM_yO_2$ (where $0<x<1$, $0<y<1$, $0<x+y<1$, and M is a metal such as Al, Sr, Mg, La, etc.), $LiFeO_2$, $V_2O_5$, $TiS_2$, and $MoS_2$.

The lithium secondary battery of the present invention uses a lithium metal, a lithium-containing alloy, a material that is capable of reversibly forming a lithium-containing compound, or a material that is capable of reversible intercalation/deintercalation of the lithium ions, as a negative active material.

Examples of a material that is capable of reversible intercalation/deintercalation of the lithium ions are crystalline or amorphous carbon, and a carbon complex. Examples of crystalline carbon include natural graphite or artificial graphite such as mesocarbon fiber (MCF) or mesocarbon microbeads (MCMB). Examples of non-crystalline carbon include soft carbon (low-temperature calcinated carbon), which is obtained by heat-treating pitch at 1000° C., and hard carbon (high-temperature calcinated carbon), which is obtained by carbonizing polymer resin.

As aforementioned above, the lithium secondary battery of the present invention has an improved battery performance even though using a graphite as a negative active material. Accordingly graphite, preferably natural graphite, can be used as a negative active material.

A lithium secondary battery may be fabricated by the following process. A slurry including active materials is coated at an appropriate thickness and length on a current collector to fabricate positive and negative electrodes. An electrode assembly is prepared by winding or laminating a positive electrode, a negative electrode, and a separator interposed therebetween. It is then placed into a battery case. An electrolyte of the present invention is injected into the case, and the upper part of the battery case is sealed. The separator interposed between the positive and negative electrodes may be a polyethylene, polypropylene, or polyvinylidene fluoride monolayered separator; a polyethylene/polypropylene double layered separator; a polyethylene/polypropylene/polyethylene three layered separator; a polypropylene/polyethylene/polypropylene three layered separator; or other similar separator.

The lithium secondary battery may be a power source for many types of electrical equipment, including portable telephones, cellular phones, game machines, portable televisions, notebook computers, and calculators.

The present invention is further explained in more detail with reference to the following examples. These examples, however, should not be interpreted as limiting the scope of the present invention in any manner.

EXAMPLES AND COMPARATIVE EXAMPLES

Example 1

γ-butyrolactone/ethylene carbonate/ethylmethyl carbonate/dimethyl carbonate/fluorobenzene(GBL/EC/EMC/DMC/FB) were mixed in a volume ratio of 4/28/48/10/10 and then 1.15M $LiPF_6$ and 0.01M $LiBF_4$ was added to the solvent. Vinylene carbonate was added in an amount of 2 wt % based on the total weight of electrolyte to prepare an electrolyte.

A positive active material, $LiCoO_2$ having a 10 μm average particle diameter, a conductive agent, Super P (acetylene black), and a binder, polyvinylidenefluoride (P)VdF), were mixed in a weight ratio of 94:3:3 in N-methyl-2-pyrrolidone (NMP) to prepare a positive slurry. The slurry was coated on an aluminum foil, dried, and compressed by a roll press, thus *producing a positive electrode having a width of 4.9 cm and a thickness of 147 μm. Natural graphite as a negative active material, oxalic acid, and styrene-butadiene rubber as a binder were is mixed in a weight ratio of 89.8:0.2:10 in water to prepare a negative slurry. The slurry was coated on a copper foil, dried, and compressed by a roll press, thus producing a negative electrode that is 5.1 cm wide and 178 μm thick. A polyethylene porous film separator having a width of 5.35 cm and a thickness of 18 μm was interposed between the positive and negative electrodes, and then the electrodes and separator were wound and placed into aluminum cans. 2.3 g of the electrolyte prepared as described above were injected into the cans, thus producing a prismatic-type 740 mAh lithium secondary battery cell.

Example 2

A lithium secondary battery cell was prepared in the same manner as in Example 1, except that 1.15 M $LiPF_6$ and 0.03M $LiBF_4$ as a lithium salt and vinylene carbonate in an amount of 2 wt % based on the total weight of electrolyte were added to a solvent of γ-butyrolactone/ethylene carbonate/ethylmethyl carbonate/dimethyl carbonate/fluorobenzene (GBL/EC/EMC/DMC/FB) mixed in a volume ratio of 2/29/49/10/10 to prepare an electrolyte.

Example 3

A lithium secondary battery cell was prepared in the same manner as in Example 1, except that 1.15 M $LiPF_6$ and 0.03M $LiBF_4$ as a lithium salt and vinylene carbonate in an amount of 2 wt % based on the total weight of electrolyte were added to a solvent of γ-butyrolactone/ethylene carbonate/ethylmethyl carbonate/dimethyl carbonate/fluorobenzene (GBL/EC/EMC/DMC/FB) mixed in a volume ratio of 8/28/46/9/9 to prepare an electrolyte.

Example 4

A lithium secondary battery cell was prepared in the same manner as in Example 1, except that 1.15 M $LiPF_6$ and 0.005M $LiBF_4$ as a lithium salt and vinylene carbonate in an amount of 2 wt % based on the total weight of electrolyte were added to a solvent of ethylene carbonate/ethylmethyl carbonate/dimethyl carbonate/fluorobenzene (EC/EMC/DMC/FB) mixed in a volume ratio of 30/50/10/10 to prepare an electrolyte.

Example 5

A lithium secondary battery cell was prepared in the same manner as in Example 1, except that 1.15 M $LiPF_6$ and 0.01M $LiBF_4$ as a lithium salt and vinylene carbonate in an amount of 2 wt % based on the total weight of electrolyte were added to a solvent of ethylene carbonate/ethylmethyl carbonate/dimethyl carbonate/fluorobenzene (EC/EMC/DMC/FB) mixed in a volume ratio of 30/50/10/10 to prepare an electrolyte.

Example 6

A lithium secondary battery cell was prepared in the same manner as in Example 1, except that 1.15 M $LiPF_6$ and 0.05M $LiBF_4$ as a lithium salt and vinylene carbonate in an amount of 2 wt % based on the total weight of electrolyte were added to a solvent of ethylene carbonate/ethylmethyl carbonate/dimethyl carbonate/fluorobenzene (EC/EMC/DMC/FB), mixed in a volume ratio of 30/50/10/10 to prepare an electrolyte.

Example 7

A lithium secondary battery cell was prepared in the same manner as in Example 1, except that 1.15 M $LiPF_6$ and 0.1M $LiBF_4$ as a lithium salt and vinylene carbonate in an amount of 2 wt % based on the total weight of electrolyte were added to a solvent of ethylene carbonate/ethylmethyl carbonate/dimethyl carbonate/fluorobenzene(EC/EMC/DMC/FB) mixed in a volume ratio of 30/50/10/10 to prepare an electrolyte.

Example 8

A lithium secondary battery cell was prepared in the same manner as in Example 1, except that 1.15 M $LiPF_6$ and 0.2M $LiBF_4$ as a lithium salt and vinylene carbonate in an amount of 2 wt % based on the total weight of electrolyte were added to a solvent of ethylene carbonate/ethylmethyl carbonate/dimethyl carbonate/fluorobenzene(EC/EMC/DMC/FB) mixed in a volume ratio of 30/50/10/10 to prepare an electrolyte.

Comparative Example 1

A lithium secondary battery cell was prepared in the same manner as in Example 1, except that 1.15 M $LiPF_6$ as a lithium salt was added to a solvent of a solvent of γ-butyrolactone/ethylene carbonate/ethylmethyl carbonate/dimethyl carbonate/fluorobenzene (GBL/EC/EMC/DMC/FB) mixed in a volume ratio of 4/28/48/10/10 to prepare an electrolyte.

Comparative Example 2

A lithium secondary battery cell was prepared in the same manner as in Example 1, except that 1.15 M $LiPF_6$ as a lithium salt and vinylene carbonate in an amount of 2 wt % based on the total weight of electrolyte were added to a solvent of a solvent of γ-butyrolactone/ethylene carbonate/ethylmethyl carbonate/dimethyl carbonate/fluorobenzene (GBL/EC/EMC/DMC/FB) mixed in a volume ratio of 2/29/49/10/10 to prepare an electrolyte.

Comparative Example 3

A lithium secondary battery cell was prepared in the same manner as in Example 1, except that 1.15 M $LiPF_6$ and 0.01M $LiBF_4$ as a lithium salt were added to a solvent of a solvent of γ-butyrolactone/ethylene carbonate/ethylmethyl carbonate/dimethyl carbonate/fluorobenzene (GBL/EC/EMC/DMC/FB) mixed in a volume ratio of 4/28/48/10/10 to prepare an electrolyte.

Comparative Example 4

A lithium secondary battery cell was prepared in the same manner as in Example 1, except that 1.15 M $LiPF_6$ as a lithium salt was added to a solvent of ethylene carbonate/ethylmethyl carbonate/dimethyl carbonate/fluorobenzene (EC/EMC/DMC/FB) mixed in a volume ratio of 30/50/10/10 to prepare an electrolyte.

The electrolyte compositions of Examples 1 to 8 and Comparative Examples 1 to 4 are shown in the Table 1.

TABLE 1

| | Organic solvent | $LiPF_6$ | $LiBF_4$ | Vinylene carbonate |
|---|---|---|---|---|
| Example 1 | GBL/EC/EMC/DMC/FB 4/28/48/10/10 | 1.15M | 0.01M | 2 wt % |
| Example 2 | GBL/EC/EMC/DMC/FB 2/29/49/10/10 | 1.15M | 0.03M | 2 wt % |
| Example 3 | GBL/EC/EMC/DMC/FB 8/28/46/9/9 | 1.15M | 0.03M | 2 wt % |

TABLE 1-continued

|  | Organic solvent | $LiPF_6$ | $LiBF_4$ | Vinylene carbonate |
|---|---|---|---|---|
| Example 4 | EC/EMC/DMC/FB 30/50/10/10 | 1.15M | 0.005M | 2 wt % |
| Example 5 | EC/EMC/DMC/FB 30/50/10/10 | 1.15M | 0.01M | 2 wt % |
| Example 6 | EC/EMC/DMC/FB 30/50/10/10 | 1.15M | 0.05M | 2 wt % |
| Example 7 | EC/EMC/DMC/FB 30/50/10/10 | 1.15M | 0.1M | 2 wt % |
| Example 8 | EC/EMC/DMC/FB 30/50/10/10 | 1.15M | 0.2M | 2 wt % |
| Comp. Example 1 | GBL/EC/EMC/DMC/FB 4/28/48/10/10 | 1.15M | — | — |
| Comp. Example 2 | GBL/EC/EMC/DMC/FB 2/29/49/10/10 | 1.15M | — | 2 wt % |
| Comp. Example 3 | GBL/EC/EMC/DMC/FB 4/28/48/10/10 | 1.15M | 0.01M | — |
| Comp. Example 4 | EC/EMC/DMC/FB 30/50/10/10 | 1.15M | — | 2 wt % |

Figure 2:
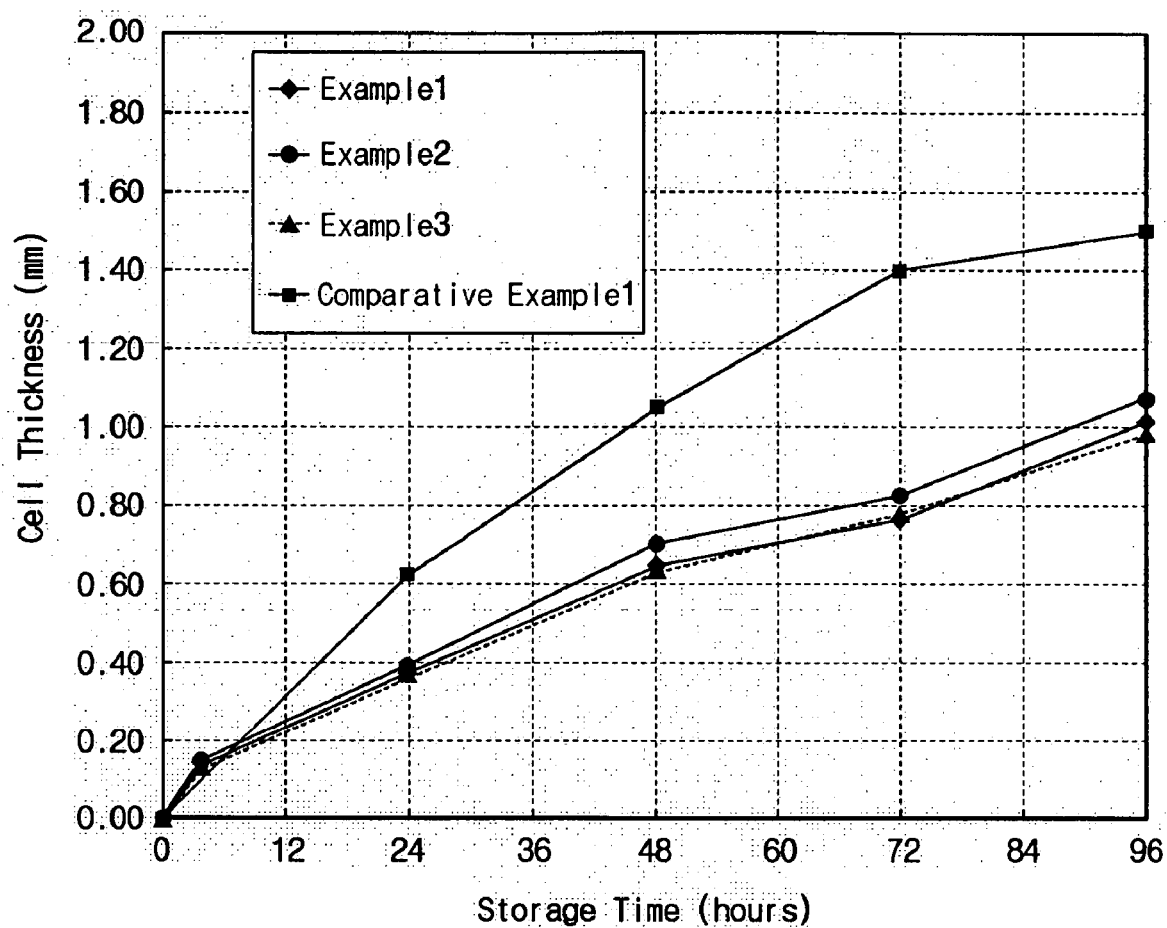
FIG. 2 shows thickness variation after batteries of Examples 1-3 and Comparative Example 1 were placed at high temperature.

In order to evaluate the swelling inhibition properties, the prismatic lithium secondary battery cells of Examples 1 to 3 and Comparative Example 1 were charged at 0.5 C with a cut-off voltage of 4.2V under constant current and constant voltage (CC-CV) at a temperature of 25° C. and placed in a high temperature chamber at 90° C. for 4 hours, and then the thickness variation from before and after storage of each cell was measured. The results are shown in FIG. 2. As illustrated in FIG. 2, the thickness variation of the cells of Examples 1 to 3 is smaller than that of Comparative Example 1.

Figure 3:
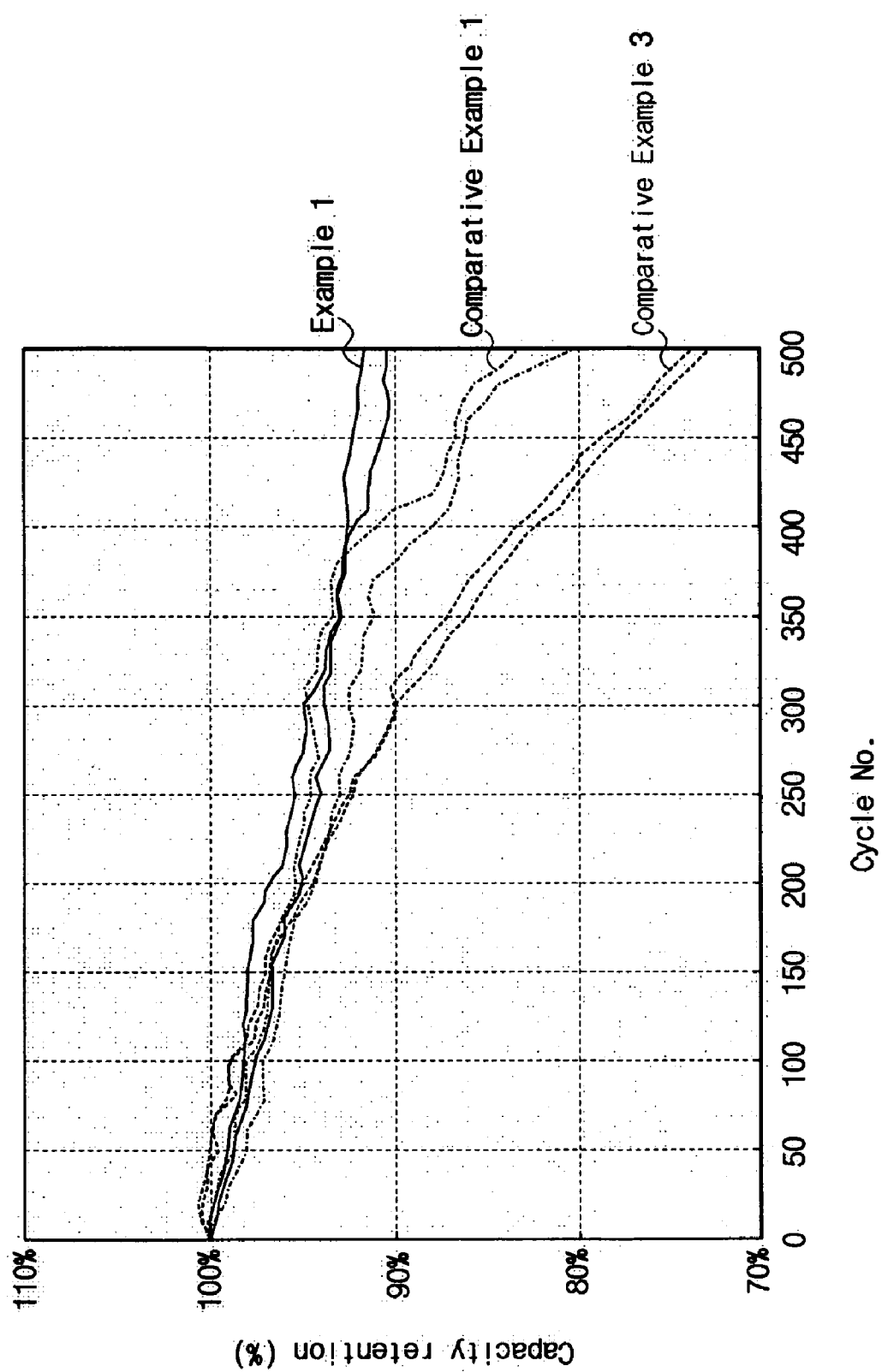
FIG. 3 shows cycle-life characteristics of the battery cells according to Example 1 of the present invention and Comparative Examples 1 and 3.

The lithium secondary battery cells of Example 1 and Comparative Examples 1 and 3 were charged at 1 C with a cut-off voltage of 4.2V under constant current and constant voltage (CC-CV) at a temperature of 25° C. and then discharged at 1 C to a cut-off voltage of 3V under constant current. The charge-discharge was repeated 500 times to evaluate cycle-life characteristics, which are shown in FIG. 3. In FIG. 3, capacity retention is a percentage based on the first cycle discharge capacity. The cycle-life characteristics were measured twice and FIG. 3 shows the average values. As illustrated in FIG. 3, Example 1 using a mixed salt of $LiPF_6$ and $LiBF_4$ shows good cycle-life characteristics as compared to Comparative Examples 1 and 3, and especially as compared to Comparative Example 3, which shows a significant decrease of cycle-life.

Standard capacity, thickness variation after storage at 90° C., and cycle-life characteristics (capacity retention after 500 cycle charge-discharges) for Examples 4, 5, 6, 7 and 8 and Comparative Example 4 were measured in order to evaluate the battery performance depending on an amount of $LiBF_4$. The standard capacity was measured by charging at 0.5 C with a cut-off voltage of 4.2V under CC-CV at a temperature of 25° C. for three hours and discharging at 0.5 C with a cut-off voltage of 3.0V under constant current. The thickness variation and cycle-life characteristics were measured using the above methods. Table 2 shows the result.

TABLE 2

|  | Standard capacity | Thickness variation (mm) | Cycle-life |
|---|---|---|---|
| Example 4 | 100% | 1.8 | 85% |
| Example 5 | 100% | 1.1 | 92% |
| Example 6 | 100% | 1.1 | 92% |

TABLE 2-continued

|  | Standard capacity | Thickness variation (mm) | Cycle-life |
|---|---|---|---|
| Example 7 | 96% | 1.2 | 91% |
| Example 8 | 93% | 1.6 | 89% |
| Comparative Example 4 | 100% | 2 | 81% |

As Table 2 shows, Examples 4, 5, 6, 7 and 8 show less thickness variation than Comparative Example 4 indicating that swelling inhibition properties at high temperature of the Examples 4, 5, 6, 7 and 8 according to the present invention were superior to that of the Comparative Example 4. The cycle lives of Examples 4 through 8 were also better. Swelling inhibition properties and cycle-life characteristics were noteworthy when the concentration of $LiBF_4$ was within the range of 0.01 to 0.1 M.

In order to evaluate battery performance depending on the vinylene carbonate amount, the cells of Examples 9, 10, 11, 12 and 13 and Comparative Example 5 were fabricated in the same manner as Example 1, except for the electrolyte composition as noted in Table 3.

TABLE 3

|  | Organic solvent | $LiPF_6$ | $LiBF_4$ | Vinylene carbonate |
|---|---|---|---|---|
| Example 9 | EC/EMC/DMC/FB 30/50/10/10 | 1.15M | 0.05M | 1 wt % |
| Example 10 | EC/EMC/DMC/FB 30/50/10/10 | 1.15M | 0.05M | 2 wt % |
| Example 11 | EC/EMC/DMC/FB 30/50/10/10 | 1.15M | 0.05M | 3 wt % |
| Example 12 | EC/EMC/DMC/FB 30/50/10/10 | 1.15M | 0.05M | 5 wt % |
| Example 13 | EC/EMC/DMC/FB 30/50/10/10 | 1.15M | 0.05M | 7 wt % |
| Comp. Example 5 | EC/EMC/DMC/FB 30/50/10/10 | 1.15M | 0.05M | — |

Standard capacity, thickness variation after storage at 90° C., and cycle-life characteristics (capacity retention after 500 cycle charge-discharges) of Examples 9 through 12 and Comparative Example 5 were measured using the above methods. Table 4 shows the results.

TABLE 4

|  | Standard capacity | Thickness variation (mm) | Cycle-life |
|---|---|---|---|
| Example 9 | 100% | 1 | 81% |
| Example 10 | 100% | 1.1 | 92% |
| Example 11 | 100% | 1.2 | 93% |
| Example 12 | 99% | 2 | 92% |
| Comp. Example 5 | 98% | 3 | 75% |

As shown in Table 4, swelling inhibition properties at high temperatures and cycle-life characteristics of the cells of the Examples 9 through 12 according to the present invention were superior to that of the Comparative Example 5.

The electrolyte as shown in various embodiments of the present invention may inhibit swelling at high temperature storage and may help prevent capacity and cycle-life deterioration.

It will be apparent to those skilled in the art that various modifications and variation can be made in the present invention without departing from the spirit or scope of the is invention. Thus, it is intended that the present invention cover the modifications and variations of this invention provided they come within the scope of the appended claims and their equivalents.

What is claimed is:

1. An electrolyte for a lithium secondary battery, comprising:
   lithium salts including $LiPF_6$ and $LiBF_4$;
   a non-aqueous organic solvent including an organic solvent with high boiling point; and
   vinylene carbonate,
   wherein a mole ratio of $LiBF_4/LiPF_6$ ranges from 0.007 to 0.1,
   wherein the electrolyte further comprises an aromatic hydrocarbon solvent of Formula (1):

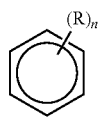

(1)

wherein R is a halogen or a $C_1$-$C_{10}$ alkyl; and n is an integer in a range of 0 to 6, and
   wherein the organic solvent with high boiling point ranges from 2 to 50 vol % of the total non-aqueous solvent.

2. The electrolyte of claim 1, wherein a concentration of $LiPF_6$ is in a range of 1.0 to 1.15M and a concentration of $LiBF_4$ is in a range of 0.01 to 0.1M.

3. The electrolyte of claim 1, wherein a mole ratio of $LiBF_4/LiPF_6$ ranges from 0.01 to 0.03.

4. The electrolyte of claim 1, wherein a concentration of the lithium salts range from 0.6 to 2.0 M.

5. The electrolyte of claim 1, wherein the vinylene carbonate is in a range of 0.01 to 10 wt % of total electrolyte.

6. The electrolyte of claim 5, wherein the vinylene carbonate is in a range of 0.01 to 5 wt % of total electrolyte.

7. The electrolyte of claim 6, wherein the vinylene carbonate is in a range of 2 to 5 wt % of total electrolyte.

8. The electrolyte of claim 1, wherein the organic solvent with high boiling point has a boiling point of 100° C. or higher.

9. The electrolyte of claim 8, wherein the organic solvent has a boiling point of 150° C. or higher.

10. The electrolyte of claim 9, wherein the organic solvent has a boiling point of 200° C. or higher.

11. The electrolyte of claim 1, wherein the organic solvent with high boiling point is selected from a group consisting of γ-butyrolactone (GBL), ethylene carbonate, dipropyl carbonate, acid anhydride, N-methyl pyrrolidone, N-methylacetamide, N-methyl formamide, acetonitrile, dimethyl formamide, sulfolane, dimethyl sulfoxide, dimethyl sulfite, γ-valerolactone, γ-caprolactone, δ-valerolactone, ε-caprolactone and a mixture thereof.

12. The electrolyte of claim 1, wherein the electrolyte further comprises a carbonate-based organic solvent with low boiling point.

13. The electrolyte of claim 12, wherein the carbonate-based organic solvent with low boiling point is selected from a group consisting of dimethyl carbonate (DMC), diethyl carbonate (DEC), methylpropyl carbonate (MPC), ethylpropyl carbonate (EPC), methylethyl carbonate (MEC), propylene carbonate (PC), butylene carbonate (BC) and a mixture thereof.

14. The electrolyte of claim 1, wherein the aromatic hydrocarbon solvent is selected from a group consisting of benzene, chlorobenzene, nitrobenzene, fluorobenzene, toluene, fluorotoluene, trifluorotoluene, xylene and a mixture thereof.

15. A lithium secondary battery, comprising:
   a positive electrode comprising a material that is capable of reversible intercalation/deintercalation of lithium ions, as a positive active material;
   a negative electrode comprising a lithium metal, a lithium-containing alloy, a material that is capable of reversibly forming a lithium-containing compound, or a material that is capable of reversible intercalation/deintercalation of lithium ions, as a negative active material; and
   an electrolyte, further comprising:
   lithium salts including $LiPF_6$ and $LiBF_4$;
   a non-aqueous organic solvent including organic solvent with high boiling point; and
   vinylene carbonate,
   wherein a mole ratio of $LiBF_4/LiPF_6$ ranges from 0.007 to 0.1,
   wherein the electrolyte further comprises an aromatic hydrocarbon solvent of Formula (1):

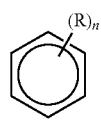

(1)

wherein R is a halogen or a $C_1$-$C_{10}$ alkyl; and n is an integer in a range of 0 to 6, and
   wherein the organic solvent with high boiling point ranges from 2 to 50 vol % of the total non-aqueous solvent.

16. The lithium secondary battery of claim 15, wherein the positive active material is lithium-nickel-based oxide, lithium-nickel-manganese-based oxide, or a lithium-containing calcogenide compound.

17. The lithium secondary battery of claim 15, wherein the negative active material is graphite.

18. The lithium secondary battery of claim 15, wherein the lithium secondary battery is a lithium ion battery or a lithium polymer battery.

* * * * *